(12) United States Patent
  Yagoubov

(10) Patent No.: US 9,182,298 B2
(45) Date of Patent: Nov. 10, 2015

(54) BLACKBODY CALIBRATION STANDARD FOR SUBMILLIMETER FREQUENCY RANGE

(75) Inventor: Pavel Yagoubov, Vaterstetten (DE)

(73) Assignee: European Organisation for Astronomical Research in the Southern Hemisphere, Garching bei Munchen (DE)

( * ) Notice: Subject to any disclaimer, the term of this patent is extended or adjusted under 35 U.S.C. 154(b) by 594 days.

(21) Appl. No.: 13/600,917

(22) Filed: Aug. 31, 2012

(65) Prior Publication Data

US 2013/0056625 A1 Mar. 7, 2013

(30) Foreign Application Priority Data

Sep. 2, 2011 (EP) .................................... 11007146

(51) Int. Cl.
  *G01D 18/00* (2006.01)
  *G01K 15/00* (2006.01)
  *G01J 5/52* (2006.01)
  *G01K 11/00* (2006.01)

(52) U.S. Cl.
  CPC .............. *G01K 15/002* (2013.01); *G01J 5/522* (2013.01); *G01K 11/006* (2013.01)

(58) Field of Classification Search
  CPC ....................................................... G01J 5/522
  See application file for complete search history.

(56) References Cited

U.S. PATENT DOCUMENTS

| 4,672,211 A * | 6/1987 | Bartell ...................... 250/493.1 |
| 5,739,533 A | 4/1998 | Okubo et al. |
| 2002/0021739 A1* | 2/2002 | Fraden ............................. 374/2 |
| 2008/0204757 A1* | 8/2008 | Manning ...................... 356/451 |

FOREIGN PATENT DOCUMENTS

| EP | 0 682 237 A1 | 11/1995 |
| JP | 60 250223 A | 12/1985 |
| JP | 8-29262 A | 2/1996 |
| WO | WO 2010/020816 A1 | 8/2009 |
| WO | WO 2010/020814 A1 | 2/2010 |

OTHER PUBLICATIONS

Office Action mailed Oct. 14, 2014 in Canadian Patent Application No. 2,788,199.
Japanese Office Action dated Dec. 16, 2013, issued in counterpart Japanese Application No. 2012-189723 (JP 60-250223 already of record).

(Continued)

*Primary Examiner* — David Porta
*Assistant Examiner* — Hugh H Maupin
(74) *Attorney, Agent, or Firm* — Novak Druce Connolly Bove + Quigg LLP

(57) ABSTRACT

Blackbody calibration standard including a main absorber and a secondary absorber, wherein the main absorber is comprised in a cavity and the secondary absorber is comprised in a cavity and the secondary absorber is arranged such that it surrounds the cavity comprising the main absorber.

21 Claims, 3 Drawing Sheets

(56) References Cited

OTHER PUBLICATIONS

Jan. 14, 2014 Canadian Office Action in corresponding Canadian Application No. 2,788,199.
Office Action mailed Sep. 24, 2014 in Japanese Patent Application No. 2012-189723 with English translation.
Aug. 20, 2013 Office Action in parallel JP 2012-189723 and English translation; citing JP 60-25-223 from EP Search Report (already of record).
Aug. 22, 2013 Office Action in corresponding CA Application No. 2,788,199 (citing JP 60-250223 already of record).
EP Search Report in EP 11 00 7146 mailed Feb. 14, 2012.

* cited by examiner

BLACKBODY CALIBRATION STANDARD FOR SUBMILLIMETER FREQUENCY RANGE

FIELD OF THE INVENTION

The invention relates to blackbody calibration standards for the submillimeter frequency range, in this text also referred to as calibration loads. Calibration loads may be used to calibrate the amplitude scale for instruments working e.g. in the submillimeter frequency range, like e.g. interferometers, spectrometers, radiometers or other detectors working in that frequency range.

BACKGROUND

Calibration standards are usually built to have properties similar to perfect black bodies, namely a high absorptivity and a high emissivity. Examples of how to design calibration loads can be found for example in the documents WO 2010/020816 and WO 2010/0200814 disclosing calibration loads.

In document WO 2010/020814 a calibration load is disclosed for use in calibrating an electromagnetic sensor, the calibration load comprising a multiplicity of protruding elements projecting from a surface, wherein the projecting elements are arranged with a degree of randomness, thereby suppressing Bragg reflections from the surface.

In document WO 2010/020816 a calibration load is disclosed that may be used in calibrating a radiometer, the calibration load comprising a hollow disk of thermally conductive material defining a cavity, with an aperture at the center of one face of the disk.

SUMMARY OF THE INVENTION

The invention relates to the problem of how to provide an efficient and accurate calibration standard for submillimeter frequency range that performs reasonably well be used under laboratory and/or non-laboratory conditions. Calibration standards may, e.g., be influenced by the orientation of the gravity vector (e.g., relative to the calibration standard) and a variation of it, air flow disturbances, etc. As a body's emissivity is proportional to its absorptivity, the calibration load and its properties are mainly discussed in terms of the absorptivity of the calibration load. However, by explaining how to increase the absorptivity of the system, one explains at the same time how to increase the emissivity.

This problem is solved by a calibration load and a method as described herein.

The invention provides a calibration load comprising a main absorber and a secondary absorber wherein the main absorber is comprised in a cavity and wherein the secondary absorber is also comprised in a cavity and arranged such that it surrounds the cavity comprising the main absorber. Such geometry may also be described as folded geometry or in particular as geometry of a folded cone.

By surrounding the cavity comprising the main absorber with a secondary absorber it may be possible to absorb radiation efficiently while at the same time being able to build the calibration load very compactly, while, e.g. keeping a required minimum size of the radiation entrance.

Surrounding the main absorber by a secondary absorber of the same temperature may improve thermal isolations of the main absorber from the environment. This may improve the accuracy of the calibration standard as the field distribution may have a higher density in the center for most instruments and may thus be intercepted largely by the main absorber.

Surrounding in this context may mean that the second cavity extends once around the cavity of the first absorber in at least one plane. It usually does not surround the cavity of the first absorber in all possible planes, it may therefore in particular not surround the cavity of the first absorber in all directions.

Such a calibration load may be capable of operating across frequency ranges between 25 GHz and 1025 GHz at the same time exhibiting emissivity of more than 0.9 in particular more than 0.99, in particular more than 0.999. Coherent return losses may be better than −60 decibel, in particular they may be better than −50 decibel for e.g. calibration loads used with temperatures considerably higher than ambient temperatures. Such return losses may be better than −60 decibel, in particular better than −50 decibel for the cavity comprising the main absorber and/or for the cavity comprising the secondary absorber when they are considered as separate building parts. Also, the emissivity may be more than 0.9, in particular more than 0.99, in particular more than 0.999 for one and/or both of the cavities mentioned before.

In addition, the compact way to build a calibration load according to the invention wherein the secondary absorber surrounds the main absorber leading to a more compact way of arrangement of the calibration load, may lead to higher thermal stability. This may be important if the calibration is used in any place where the temperature cannot be stabilized from the outside. It may also be important when the calibration load is heated by the radiation and/or by other external or internal influences. In this case the temperature gradient may lead to inhomogeneous thermal properties over the calibration load thereby possibly distorting the absolute calibration accuracy. This may lead to an unfavorable influence over the properties of the calibration load that should imitate a perfect black body preferably with approximately uniform (e.g. ±5° C. or ±2° C. or ±1° C. maximal difference) or uniform temperature across an input aperture. In particular, a calibration load may not be useable if phenomena like convection or a thermal gradient become too important. Those phenomena may be less relevant if the volume is small and in particular if the length and diameter of the calibration load are small. Therefore, the invention may lead to higher stability compared to systems with the same or similar components, wherein the second absorber does not surround the first absorber, e.g. where the part that surrounds the first absorber in the embodiments of the invention is attached as elongation of the first absorber and not surrounding it.

A calibration load according to the invention may comprise a part that is designed such that the radiation may enter there, e.g. designed as an opening (input aperture). This part may in this text be referred to as an opening and/or entrance for radiation and/or radiation entrance and/or input aperture.

The cavity in which the secondary absorber is arranged/comprised in a calibration load according to the invention may comprise a main reflector. The main reflector may e.g. be attached to the wall of the cavity and/or form part of the wall of the cavity comprising the secondary absorber. This main reflector may be arranged such that it reflects radiation which is not intercepted by the main absorber towards the secondary absorber, thereby possibly increasing the absorptivity and/or the size of the opening. In particular, the main reflector may be arranged such that the radiation is absorbed as if the secondary absorber were present at two walls, wherein the second secondary absorber is the mirror image of the first secondary absorber.

A calibration load as described before may also comprise a secondary reflector. A secondary reflector may be or can be arranged such that it can lead radiation towards the main and/or secondary absorber and/or main reflector. In particular, it may be arranged such that the secondary reflector is inclined with respect to the direction of the incoming radiation and/or (approximate) axis of symmetry of the calibration load in case the calibration load is arranged (approximately) symmetrically. The secondary reflector may in particular be arranged extending to and/or from the outside of and/or around/surrounding the part of the calibration load that is designed to let radiation enter, also referred to as the entrance for radiation.

Main and/or secondary reflector are preferably made out or comprise a material that is highly reflective. They may e.g. comprise or be made out of aluminum and/or a coated material comprising several layers optimized for reflection in the submillimeter frequency range.

The inclination of the secondary reflector may be adjusted to the calibration load geometry thus it may reduce the losses through light that is reflected out of the calibration load. It may therefore increase the absorptivity of the calibration load.

The main absorber may comprise a pointed end which may form an acute angle. The pointed end may be arranged opposite to the radiation entrance of the calibration load. When radiation is falling on such an absorber with a pointed end, it may be reflected several times, usually in shallow angles, before it reaches the end of the calibration load, thereby increasing the absorption. The main absorbers surfaces may be arranged in such a way that they may lead towards the pointed end straightly. In particular, they may be straight and arranged to lead radiation from the radiation entrance of the calibration load towards the pointed end. In other embodiments, they may not lead straight to the pointed end, but may for example comprise curves with slight or large curvature. A pointed end angle may be defined as the opening angle (aperture) of the circular cylindrical (right circular) cone with the largest opening angle that could be embedded at the pointed end such that its apex touches the end point of the pointed end and such that its surface is completely inside the surface defined by the tangents along the main absorber through the end point at the pointed end where the circular cylindrical cone's apex touches the pointed end, wherein the circular cylindrical cone's surface may touch those tangents. Furthermore, a calibration load may comprise a main absorber which is of a conical form (such as a right circular and/or cylindrical cone) and wherein optionally the secondary absorber is of an approximately cylindrical form being arranged around the cone. This embodiment may have advantages as the conical form (in particular the form of a circular cylindrical cone) may lead to absorption properties which may be independent of the polarization of the incoming radiation while at the same time providing shallow angles of incidence for the incoming radiation. In addition, the conical form of the main absorber may lead the radiation towards the apex, thereby possibly increasing the absorptivity as less incoming radiation may be reflected out of the calibration load before being absorbed. In addition, this may be convenient as making smooth approximately cylindrical layers or coatings as may be used for the secondary absorber may be easy or at least easier than making surfaces with other shapes.

A cylindrical cone may in this text describe a cone the axis (on which the apex lies) of which passes through the center of the base at a right angle (wherein the center of the base may be defined, e.g., as an intersection of two symmetry axes of the base or as the center of gravity of the base). This cylindrical cone is also called a right cone. It may in particular be a right circular cone, meaning a right cone with a circular base.

Whenever the expression cylinder is used in this text, it may in particular refer to a right circular cylinder (a cylinder with its symmetry axis perpendicular to the circular bases which may be open or closed).

Approximately cylindrical may mean that the form is cylindrical in all but a fabrication deviation of less than 10 degrees, in particular less than 5 degrees, in particular less than 1 degree. The angle may be measured between a straight line that would lie on a perfectly cylindrical surface of the smallest cylinder enclosing the calibration load and the approximate cylinder (the calibration load). Enclosing may in this case also comprise the boundaries of the enclosing cylinder and the calibration load having common points, and the cylinder's perpendicular surfaces may be parallel to the radiation entrance and/or the cylinder's axis of symmetry may be in common with or parallel to the (approximate) axis of symmetry of the calibration load. The angle herein may be measured in a plane comprising the axis of symmetry of the cylinder, wherein the plane is perpendicular to the cylinder's surface, the angle being measured at a point where the cylinder intersects the outside of the calibration load or—if not point of intersection exists—the cylinders surface may be moved perpendicularly to the cylinder's axis of symmetry until there is a point of intersection and then the angle at the point of intersection may be measured, again in a plane comprising the symmetry axis of the moved cylinder, wherein the plane is perpendicular to the cylinder surface of the moved cylinder.

In the above described case, an approximately straight line along the main reflector may form an acute angle with an approximately straight line along the main absorber at a point where the main absorber intersects the main reflector, wherein the angle may approximately be of the same size as the apex angle of the cone such as a right circular and/or cylindrical cone. In embodiments wherein the main reflector and the main absorber comprise straight lines, these may also be extended to an intersection, if e.g. the main absorber and main reflector do not intersect, and an angle with approximately the same size as the apex angle of the cone may also be formed at the intersection.

Whenever an angle is measured e.g. between two parts that intersect, this may be done by measuring the angle between two lines, wherein the first line is perpendicular to the tangents along the surface of the first part in the point where the angle has its vertex and wherein the second line is perpendicular to the tangents along the surface of the second part in the point where the angel has it vertex. The parts may e.g. be the main and/or secondary absorber, and/or the main and/or secondary reflector and/or the housing, etc. If more than one angle can be found which can be measured e.g. in that or the following way, usually the smallest angle of those is taken as the size of the angle to be measured. The angle may in addition/alternatively be measured in a plane perpendicular to the (two) surfaces, wherein the surfaces each comprise a (approximately) straight line along the surface in that plane, the angle being measured between the straight lines or their extensions that intersect in a point not necessarily on both surfaces, which is the vertex of the angle.

Again, approximately in combination with angles may mean that the angle is of the same size in all but a fabrication deviation of less than 10, in particular less than 5 degrees, in particular less than 1 degree.

It is also possible that the secondary absorber is not of an approximately cylindrical form arranged around the cone. For example, the secondary absorber may be arranged where in the example described before the main reflector was arranged and vice versa. In such an embodiment the main reflector may be arranged approximately cylindrically around the main absorber cavity. The angles between the parts may be as in the above described embodiment wherein the secondary absorber and the main reflector are exchanged.

An approximately straight line (along a surface and/or of a surface) may mean a tangent along the surface determined in the point where the measured angle's vertex is, the tangent usually determined such that it lies in the plane in which the angle is measured. It may also be an extension of a straight line along a surface.

A calibration load as described before may comprise a main absorber as described before wherein the cone has an apex angle of more than 2 degree and/or less than 90 degrees. In particular the apex may enclose an angle of more than 12 in particular more than 18 and in particular more than 20 degrees and/or in particular of less than 45, in particular less than 30 and in particular less than 28 degrees. The secondary absorber may form an angle of more than 1 degree and/or less of less than 45 degrees with the main reflector. In particular it may form an angle of more than 6, in particular more than 9 and in particular more than 10 degrees and/or in particular of less than 22.5 degrees, in particular or less than 15 degrees, and in particular of less than 14 degrees. Those acute angles may lead to shallow angles between the incoming radiation and the absorbers, thereby possibly increasing the absorptivity and/or reducing the backscatter (coherent return loss). The angles may be chosen in this case as acute angles as described before to assure that incoming radiation is reflected, preferably more than 7 times in a cavity like the cavity with the main absorber and/or the cavity with the secondary absorber. Incoming radiation may be reflected more than 7 times by the main and/or secondary absorber.

The main absorber and/or the secondary absorber in the calibration load may be partially or completely coated with a radiation absorbing material. The material may be adjusted to optimize absorptivity and be adjusted to the geometry of the calibration load and the properties of the radiation that the calibration load is designed to be used with. In addition, the radiation absorbing material may be chosen according to the designated operating parameters of the calibration load such that the absorptivity is optimized. The material may be different e.g. for calibration loads that are designated for hot and ambient temperature calibration.

A calibration load as described before may comprise a housing that encloses the main and the secondary absorber. That housing may be in an approximately cylindrical form. It may also be in different other forms depending on the form of the absorbers and/or the designation of use of the calibration load. It may for certain applications be in a form that is suitable for being attached or built into bigger building blocks or be included in bigger set-ups. The absorbers may also be thermally isolated from the housing and/or the housing may be thermally isolated on the outside. In particular, such a housing may be made out of or comprise a metal which may be light and/or non-oxidable, in particular it may be made out of or comprise preferably thin, alodine treated aluminum. The housing may be thermally isolated from the main and/or secondary absorber and/or from the main and/or secondary reflectors and/or sensors, heaters and/or thermal regulators to control the operation temperature (thermal control electronics) attached to the before-mentioned parts. In addition, the housing may be thermally insulated from the outside, in particular if the calibration load is designed for use as a hot calibration load.

If such a housing is present, a secondary absorber may be approximately parallel to an outer boundary of the housing. Approximately parallel may mean parallel in all but a fabrication deviation of an angle of less than 10 degrees, in particular less than 5 degrees, in particular less than 1 degree from parallel. In such an embodiment, the secondary absorber may form an acute angle with the the main reflector. In particular, this may be the case for a conical form of the main absorber. In some embodiments the main absorber may form an acute angle with the main reflector (or the secondary absorber).

In some embodiments the main absorber may be at least partially supported by a support structure which may in particular be arranged inside the housing around the pointed end of the main absorber. The support structure may be thermally isolated from the housing and/or from the main absorber. In addition, support structures may be arranged for the cavity of the secondary absorber as well. They too may be thermally isolated from the housing and/or from the cavity of the secondary absorber. The less support the walls of the cavity get from the outside, e.g. the housing, the more additional support structure may be useful e.g. in the housing of the calibration load.

The calibration load may comprise heating elements to heat the calibration load and/or thermal sensors to collect information about the temperature of the calibration load and/or electronic regulators to control the operating temperature. One or more temperature sensors per part, wherein parts may in particular be the main absorber, the secondary absorber and the main reflector, may be provided. Such calibration loads may be used to work at different temperatures than ambient temperature. In particular they may be heated up to at most 110 degrees Celsius, in particular up to at most 100 degree Celsius, thereby allowing the calibration load to be used as a hot calibration load. A calibration load may also be cooled to have temperatures of less than 0 degree Celsius, or of 0 degree Celsius or more, and/or in particular of less than 10 degrees Celsius, in particular of less than 20 degrees Celsius. The calibration load may therefore in particular be capable of being used for temperature ranges with a minimum of 0 degree Celsius and a maximum of 90 or 100 degree Celsius. The cooling may be done by heaters that are also capable of cooling, and/or by additional coolers that may be included in the calibration load and/or by external cooling e.g. with ice.

The envelope of a calibration load meaning the outside dimensions of calibration load comprising all parts as described before may have a length smaller than 600 millimeter (mm) and/or a diameter of less than 600 millimeters. In particular it might have a length smaller than 400 millimeter and/or a diameter of less than 300 millimeters, in particular the length may be smaller than or equal to 290 millimeters and/or the diameter may be less than or equal to 200 millimeters. The diameter of a calibration load may be the (maximum) diameter measured along the part of the calibration load which the radiation entrance faces and/or a (maximum) diameter measured perpendicular to the length of the load, which may be measured along the (approximate) axis of symmetry of the calibration load (if the calibration load has an (approximate) axis of symmetry).

The envelope of a calibration load may have a length larger than 100 mm, and in particular larger than 200 mm, and/or a diameter larger than 50 mm, in particular larger than 100 mm. The diameter may also determine or give the size of the input aperture of a calibration load. A larger diameter may indicate a larger size of the input aperture.

The ratio of the length of the calibration load to the diameter of the calibration load envelope may be less than 3, in particular less than 2, and in particular less than 1.5. The diameter of the calibration load may be equal to the input aperture and/or the diameter of the input aperture. Having a relatively large input aperture may therefore correspond to a relatively large diameter of the calibration load. This ratio may describe that the calibration load is compact, e.g. for a given input aperture size which may have advantages when considering e.g. the influence of convection and/or temperature gradients. In the designated frequency ranges it may e.g. be necessary to absorb radiation with a certain size of the input aperture. Thus, a certain input aperture size may be necessary and the compact form of the calibration load may be useful.

In the region or in vicinity of the region where the main absorber and part of the cavity of the secondary absorber are closest to each other, the extension of the one or more cavity walls of or parts comprised by one or more of those two parts may lead to a sharp edge. The region may therefore comprise a sharp edge which is preferably made out of a reflecting material or absorbing material. This may increase the absorption as it may reduce the amount of radiation scattered and/or absorbed in that region, and/or reduce the backscatter.

In calibration loads that may e.g. be used as hot calibration loads the sharp edge may be made out of a reflecting material. For some calibration loads that are e.g. intended to be mainly used in ambient temperature the sharp edge may be made out of absorbing material. Such a sharp edge may in addition decrease the amount of thermal energy emitted from said edge and/or lead to a smooth gradient and/or little convection.

Calibration loads as described above may have a mass of equal or less than 10 kg, in particular less than 6 kg for any type of calibration load described, in particular a calibration load designed for use at hot temperatures may have a mass of equal or less than 5.7 kg, in particular of equal or less than 5.6 kg.

A calibration load as described above may be used to calibrate the amplitude scale for a spectrometer, interferometer, radiometer or other detector working with a frequency/frequencies comprised in the submillimeter frequency range for which the calibration load may be designed. Optionally the method of using such a calibration load may comprise the step of heating and/or cooling the calibration load to a temperature above and/or below the ambient temperature.

BRIEF DESCRIPTION OF THE DRAWINGS

Some preferred embodiments are described with reference to the drawings wherein the Figures show.

DETAILED DESCRIPTION

Figure 1A:
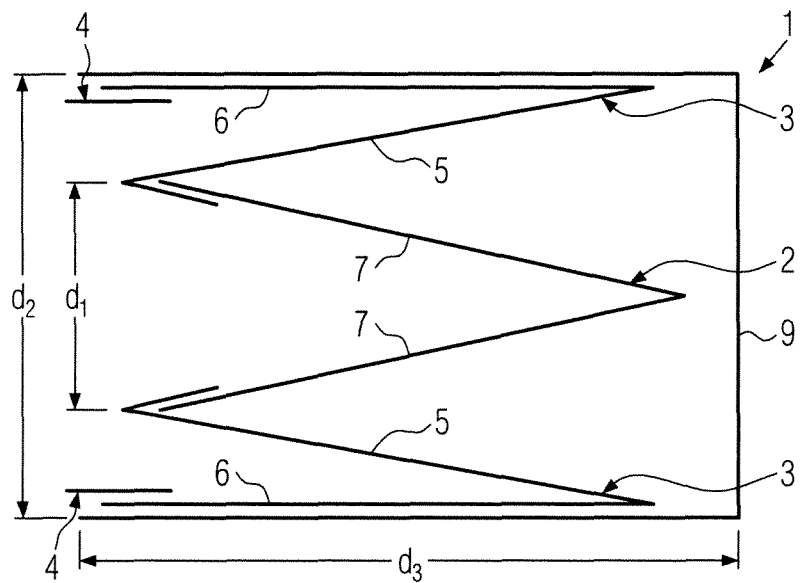
FIG. 1 shows cross-sectional (FIG. 1a) and perspective (FIG. 1b) views of an embodiment of a calibration load according to the invention.

FIG. 1a shows schematic drawing of a calibration load according to the invention. The calibration load 1 is comprised in a housing 9. In this particular embodiment, it comprises a main absorber 7 and a secondary absorber 6 as well as a main reflector 5. The main absorber 7 is comprised in this embodiment in a cylindrical cone shaped cavity 2 with a circular base (a cavity with the shape of a right circular cone). The secondary absorbers are comprised in cavity 3. The secondary reflectors 4 are arranged such that they can reflect radiation towards the absorbers in this particular case. The envelope of the calibration load has a length $d_3$ which is preferably less than 600 millimeters, in particular it may be around 290 millimeters. The diameter of the envelope $d_2$ is preferably less than 600 millimeters, in particular it may be about 200 millimeters. The diameter of the main absorber $d_1$ may be preferably less than 300 millimeters, in particular less than 150 millimeters, and in particular about 100 millimeters.

Figure 1B:
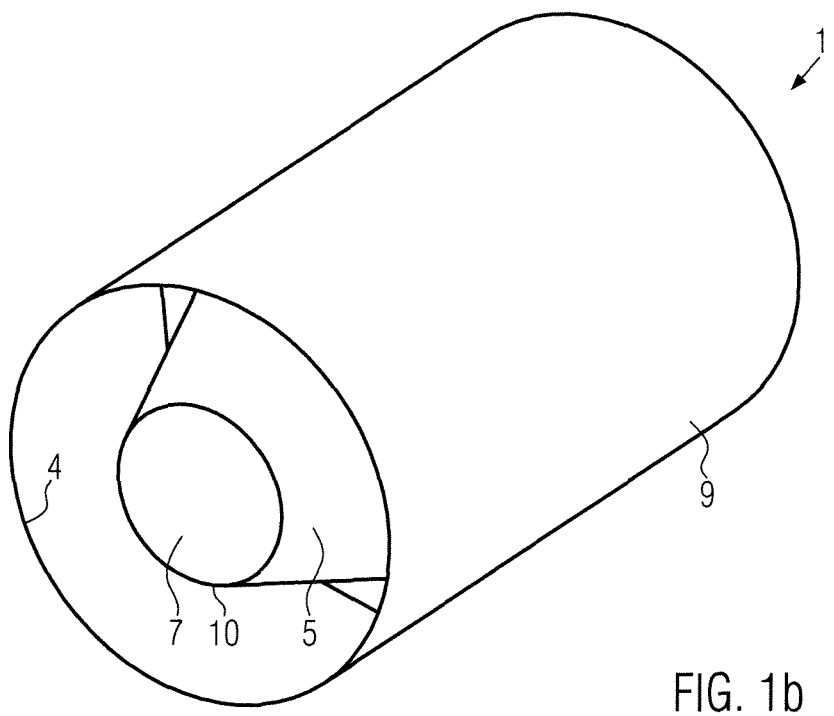

FIG. 1b shows a schematic drawing of a calibration load from the outside. The calibration load is in the housing 9 and comprises visible from the outside a secondary reflector 4 as well as preferably sharp edge 10 in the region wherein main reflector 5 and main absorber 7 are closest to each other. In particular, the sharp edge 10 may be in the region where the main absorber and/or the main reflector ends or has already ended, as shown in the drawing.

Figure 2A:
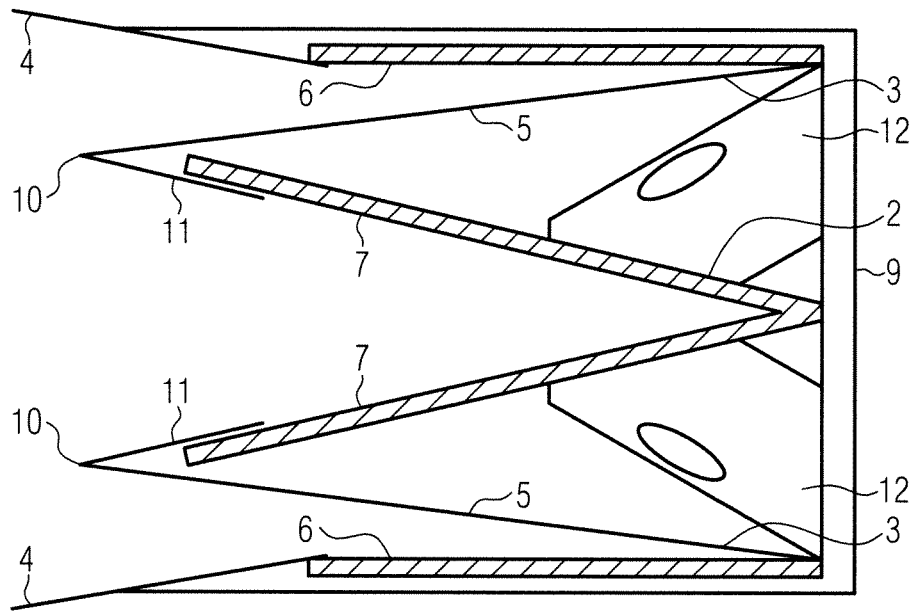
FIG. 2 shows cross-sectional views (FIGS. 2a and 2b respectively) of two embodiments of the present invention.

FIG. 2a shows a particular embodiment of the calibration load according to the invention which is preferably used as a hot calibration load in combination with heaters. The calibration load according to the invention comprises a housing 9 which may e.g. be made out of preferably thin, alodine treated aluminum which comprises main absorber 7, secondary absorber 6, main reflector 5 and secondary reflector 4. The main absorber 7 is in this particular embodiment arranged in a circular cylindrical cone structure in a main circular cylindrical cone cavity 2 and the secondary absorber is arranged in a cavity 3 which may as shown here in some embodiments have a triangular cross sectional area when a cross section of the calibration load through a diameter of the entrance for the radiation and through the apex of the main absorber is considered.

In this embodiment the secondary absorber is arranged approximately parallel to the wall of the housing, which has in particular an approximately cylindrical structure. The main absorber is supported by a support structure 12.

In other embodiments the secondary absorber may be approximately parallel to the wall of a housing having a non-cylindrical structure, or be non-parallel to the wall of the housing, which may be cylindrical or non-cylindrical. Support structure 12 is in this particular embodiment arranged around the apex of the cylindrical cone of the cavity comprising the main absorber. In other embodiments the main absorber may be comprised in a cavity which is not in the form of a circular cylindrical cone.

The apex of the circular cylindrical cone forms in this embodiment an acute angle. This angle may be in the above described region for angles of the apex of the cone, in particular the cylindrical cone angle may be around 24 degrees.

In the particular cylindrical embodiment shown in FIG. 2a, the angle between the main absorber 7 and the main reflector 5 where the main absorber 7 and the main reflector 5 intersect and/or where the extensions of two straight lines comprised by the main absorber 7 and the main reflector 5 intersect in a plane perpendicular to the surfaces and comprising the two lines, is preferably approximately the same angle as included by the main absorber at the apex of the cylindrical cone. The angle between the main reflector and the secondary absorber may in this particular embodiment be about half the angle enclosed by the apex of the cylindrical cone.

In the embodiment of FIG. 2a the main reflector 5 is prolongated to reflector part 11 which may form an acute angle with the main reflector part 5. The angle between two parts may be the angle formed by two straight lines at their intersection point, wherein one line is comprised or is an extension of a line comprised by one of the parts and the second line is comprised or is an extension of a line comprised by the other part. The angle between two parts may also be the angle between two approximately straight lines, wherein one approximately straight line is along the surface of the first part and wherein the second approximately straight line is along the surface of the second part, both approximately straight lines starting from an intersecting point of the two parts. The reflector part 11 is arranged in such a way that radiation may be led towards the main absorber 7. The region between the main reflector 5 and the main absorber 7 may comprise a sharp edge region 10. This sharp edge region is in this particular embodiment formed by at the intersection of the two parts 5 and 11 of the main reflector. This sharp edge may avoid that radiation is scattered back from the calibration load and may also increase thermal stability. The folded cone structure of the shown calibration load may increase the thermal stability as convection may be less important in a folded cone than in an exemplary calibration load in which the cone is extended, which means in this particular case that it would have twice the length. In addition, in a shorter (folded) cone the thermal gradient over the whole calibration load may be smaller. The intrusion of the reflectors inside the absorbers and/or the cavities and/or the envelope may (also) reduce the thermal gradients in the absorbers due to convection and/or air flow.

Figure 2B:
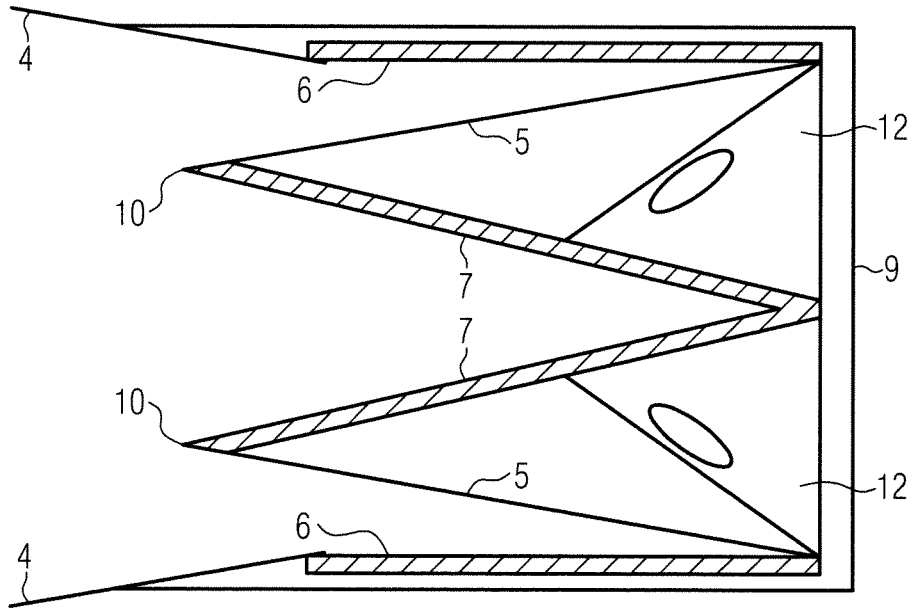

FIG. 2b shows a similar embodiment to the embodiment of FIG. 2a except that the sharp edge 10 at the region between the main absorber 7 and the main reflector 5 is this time not made out of a reflecting material but out of the absorber material of the absorber 7. Such a calibration load may e.g. be used at ambient temperatures without any heating.

Such calibration loads as described in this text, in particular as described e.g. in FIGS. 2a and 2b, may also be used to optimize the power consumption necessary to use calibration loads. A more compact calibration load is usually easier to heat. In addition, all inside parts (absorber, reflectors, etc.) may be thermally isolated from the housing to reduce power consumption for heating. Heaters may be made e.g. from heater foil. In addition, a more compact calibration load may also be less influenced by convection and/or externally caused air flow that may be present when the calibration load is used e.g. under non-laboratory conditions.

Figure 3A:
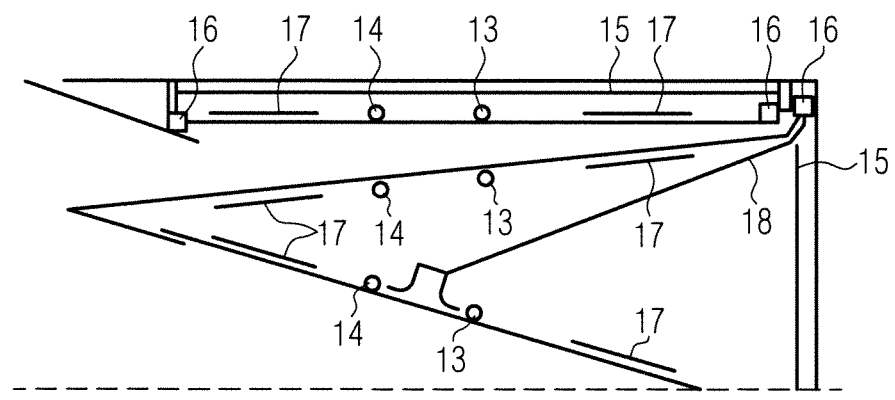
FIG. 3 shows partial cross-sectional views (FIGS. 3a and 3b respectively) of the parts of two embodiments of the present invention.

FIG. 3a shows a schematic drawing of a cross section of half a calibration load which may be used as a heated calibration load. At the reflectors and absorbers sensors are attached. At each absorber and reflector a temperature sensor 13 and/or an (additional) temperature sensor 14 used by the thermal temperature control electronic may be attached and/or employed. In addition the calibration load may also comprise heaters 17 which may for example be foil heaters. The absorbers are thermally isolated from the surrounding building blocks like the reflectors and the housing by thermal insulators 16. In addition, the housing is insulated by thermal insulators 15. Parts inside the housing may also insulated, e.g. the reflector may be insulated from parts of the main absorbers by insulation 18 and the parts by which the heaters and absorbers etc are affixed to the housing etc may also be thermally insulated e.g. by thermal insulators 16. In addition, the housing may be insulated from the outside as well. The main absorber, the secondary absorber and the main reflector may and/or can be heated to approximately the same temperature (±5° C. or ±2° C. or ±1° C.) in order to reduce thermal gradients. The secondary reflector may also be heated, but may be heated to the same or a different, e.g. lower temperature than the main reflector and the main and secondary absorber. For example, it may be heated to a temperature 10° C. or 20° C. below the temperature of the main reflector, the main absorber and the secondary absorber.

Figure 3B:
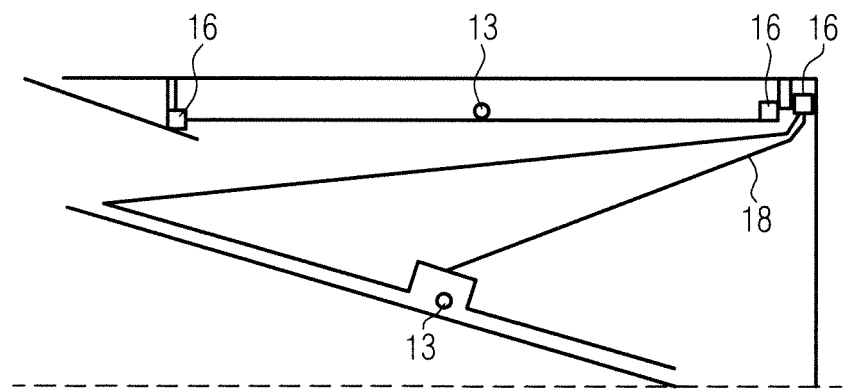

FIG. 3b shows a schematic drawing similar to the cross section of half a calibration load drawn in FIG. 3a except that the calibration load of FIG. 3b is designed such that it may preferably be used at ambient temperature. In this case the housing is insulated from the absorbers by thermal insulators 16 as well as a thermal insulator 15. However, the insulation is much less prominent than in the example shown in FIG. 3a. The embodiment of FIG. 3b does not comprise heaters and/or thermal control electronics as the example shown in FIG. 3a. It comprises temperature sensors next to and/or on the absorbers. While an embodiment designed for use e.g. as a hot calibration load for example shown in FIGS. 2a and 3a may be used for ambient temperature measurements and calibration, too, an embodiment without heaters as shown in FIGS. 2b and 3b cannot be used for calibration at non-ambient temperatures requiring heating.

The embodiments described above may be particularly useful when used at non-laboratory conditions for example when being used in different positions, wherein the gravitational vector points to different directions in the different positions with respect to the calibration load. In such cases a thermal effect like convection will point to different directions, leading to inhomogeneous effects e.g. in the temperature distribution. This may lead to convection and/or a thermal gradient which may e.g. be different for every position, thereby possibly affecting the calibration load accuracy. In this case it may be particularly suitable to have the compact structure of the calibration load described above, in which the temperature and convection effects need to be controlled for a smaller volume, in particular smaller length and/or diameter and/or smaller ratio of length to diameter. The thermal effects may therefore be smaller. In the region for which this calibration load is designed, a calibration load according to the present invention has proven reasonably stable.

The invention claimed is:

1. Calibration load comprising a first cavity and a second cavity, wherein the first cavity contains a main absorber and the second cavity contains a secondary absorber configured to surround the first cavity, and wherein the second cavity contains a main reflector configured to lead radiation towards the secondary absorber.

2. Calibration load according to claim 1, wherein the main reflector is configured to lead radiation towards the main absorber.

3. Calibration load according to claim 2, wherein the secondary absorber encloses an angle of more than 1° and/or of less than 45° with the main reflector.

4. Calibration load according to claim 1, wherein the calibration load comprises a secondary reflector configured to lead radiation towards the main and/or secondary absorber.

5. Calibration load according to claim 1, wherein the main absorber comprises a pointed end.

6. Calibration load according to claim 5, wherein the pointed end encloses an acute angle.

7. Calibration load according to claim 1, wherein the main absorber is of a conical form.

8. Calibration load according to claim 7, wherein the conical form is a right circular cone having an apex angle of more than 2°.

9. Calibration load according to claim 7, wherein the conical form is a right circular cone and the secondary absorber is of an approximately cylindrical form arranged around the cone.

10. Calibration load according to claim 1, wherein the main absorber and/or the secondary absorber in the calibration load is partially or completely coated with a radiation absorbing material.

11. Calibration load according to claim 1, wherein the calibration load comprises a housing, the housing enclosing the first and second cavities.

12. Calibration load according to claim 1, wherein the secondary absorber is approximately parallel to a boundary of the housing.

13. Calibration load according to claim 12, wherein optionally one or more boundaries of the cavity comprising the secondary absorber or extensions thereof enclose an acute angle with the main absorber.

14. Calibration load according to claim 1, wherein the main absorber is at least partially supported by a support structure.

15. Calibration load according to claim 1, wherein the calibration load comprises one or more of heating elements to heat the calibration load, thermal sensors, and thermal controllers.

16. Calibration load according to claim 1, wherein the calibration load has an envelope having one or more of a length between 100 mm and 600 mm and a diameter between 50 mm and 600 mm.

17. Calibration load according to claim 1, wherein the calibration load has an envelope and the ratio of the length of the calibration load envelope to the diameter of the calibration load envelope is less than 3.

18. Calibration load according to claim 1, wherein a sharp edge made out of a reflecting material or absorbing material is located in a region where the main absorber and the second cavity are in the closest proximity to one another.

19. Method of using the calibration load of claim 1, comprising:
calibrating an amplitude scale for a spectrometer, interferometer radiometer other detector working with a frequency/frequencies in the submillimeter frequency range.

20. Method according to claim 19, including one or more of the step of heating the calibration load to a temperature above the ambient temperature and the step of cooling the calibration load to a temperature below the ambient temperature.

21. Calibration load according to claim 1, wherein the secondary absorber encloses an angle of more than 1° and/or less than 45° with the main reflector.

* * * * *

UNITED STATES PATENT AND TRADEMARK OFFICE
CERTIFICATE OF CORRECTION

| | |
|---|---|
| PATENT NO. | : 9,182,298 B2 |
| APPLICATION NO. | : 13/600917 |
| DATED | : November 10, 2015 |
| INVENTOR(S) | : Pavel Yagoubov |

It is certified that error appears in the above-identified patent and that said Letters Patent is hereby corrected as shown below:

In column 12, line 12 (claim 19) please add a "," after the word "ometer" and add the word "or" after the word "radiometer."

The line should read as follows:

ometer, radiometer or other detector working with a fre-

Signed and Sealed this
First Day of March, 2016

Michelle K. Lee
*Director of the United States Patent and Trademark Office*